W. N. SOPHER.
FIRE POT.
APPLICATION FILED MAR. 7, 1916.
1,209,896. Patented Dec. 26, 1916.
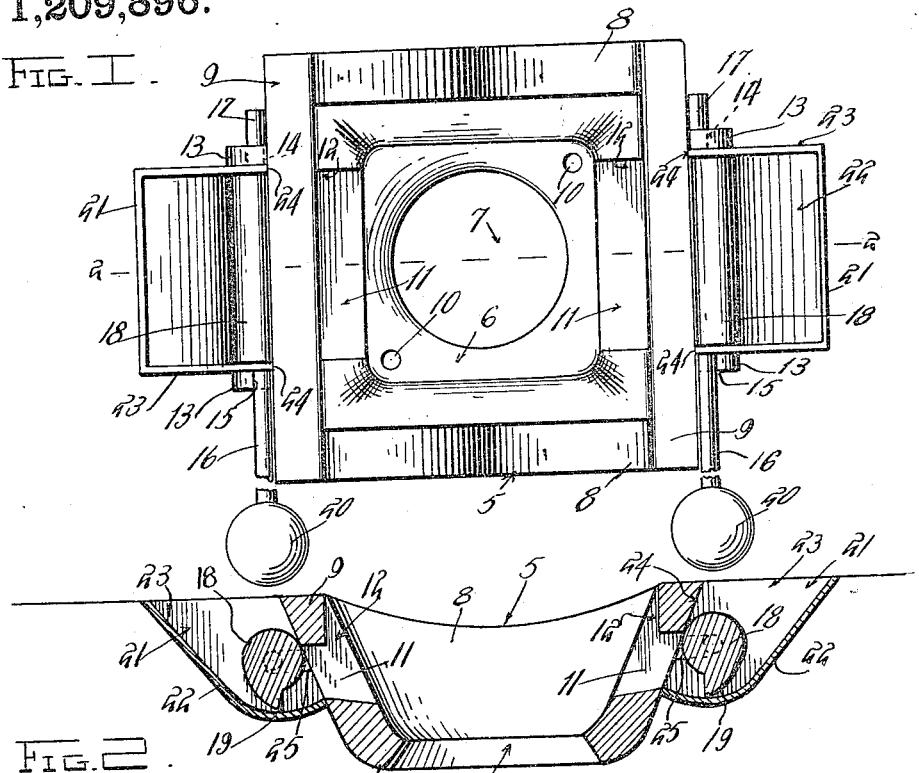
FIG. 1.
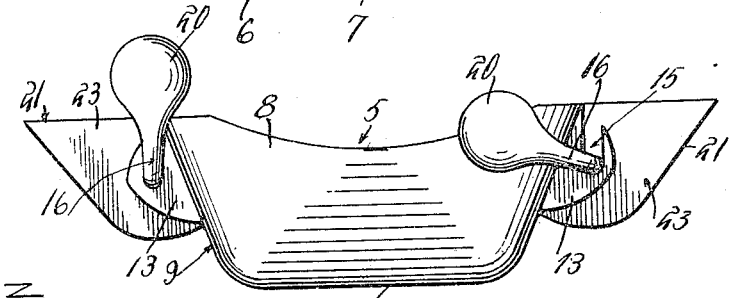
FIG. 2.
FIG. 3.
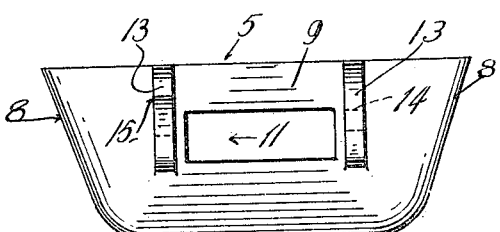
FIG. 4.
Witnesses
J. C. Simpson
S. R. Gair
Inventor
W. N. Sopher.
By Chandler & Chandler
Attorneys
THE NORRIS PETERS CO., PHOTO-LITHO., WASHINGTON, D. C.

_UNITED STATES PATENT OFFICE._

WILLIAM N. SOPHER, OF BEATRICE, NEBRASKA.

FIRE-POT.

1,209,896.    Specification of Letters Patent.    Patented Dec. 26, 1916.

Application filed March 7, 1916.  Serial No. 82,664.

*To all whom it may concern:*

Be it known that I, WILLIAM N. SOPHER, a citizen of the United States, residing at Beatrice, in the county of Gage, State of Nebraska, have invented certain new and useful Improvements in Fire-Pots; and I do hereby declare the following to be a full, clear, and exact description of the invention, such as will enable others skilled in the art to which it appertains to make and use the same.

This invention relates to fire pots, and particularly to fire pots adapted for use in connection with forges.

The primary object of the invention is to provide means whereby the fuel to be fed to the fire pot may be first converted into coke, and then delivered to the fire within the pot to be acted upon and consumed by the fire.

A further object of the invention is to provide means whereby the heat within the fire pot may be utilized to coke the fuel to be ultimately consumed by the fire.

A still further object of the invention is to provide improved means for feeding fuel into a position where it will be converted into coke, and then delivering the coke to the fire.

With these objects in view, together with others which will appear as the description proceeds, the invention resides in the novel combination and arrangement of parts all as will be described more fully hereinafter, illustrated in the drawings and particularly pointed out in the claim.

The invention will be best understood by reference to the accompanying drawings, wherein:

Figure 1, is a plan view of a fire pot constructed in accordance with my invention, Fig. 2, is a sectional view taken on the line 2—2 of Fig. 1, Fig. 3, is a side elevation of the device removed from the forge, and Fig. 4, is an end view of the fire pot with the fuel hopper removed.

Referring now more particularly to the drawings, 5 indicates generally the improved fire pot, the same being preferably rectangular in plan, having a bottom 6 provided with a centrally disposed orifice 7 through which draft may be applied to the fire within the pot. Side and end walls, 8 and 9 respectively project upward and outwardly from the said bottom to provide with said bottom a substantially bowl-shaped container, the said pot being adapted to be secured in proper position upon a forge by the insertion of suitable securing elements through the openings 10 formed in the said bottom. The end walls 9 are provided with alined openings 11, the said openings being restricted in height and elongated laterally, and are spaced upwardly beyond the bottom 6 of the pot. The inner faces of the end walls 9 may be cut away from their upper edges downwardly to provide channels 12 coextensive and communicating with the upper walls of the openings 11.

Projecting outwardly from the exterior surface of each of the end walls 9 of the fire pot is a pair of spaced ears 13, the ears of each pair being located adjacent the extreme ends of each of the openings 11. One of the ears 13 of each pair is provided with an opening or aperture 14, while the opposite ear is provided with a slot 15 opening upwardly, and the lowermost portion of said slot is in horizontal alinement with the opening 14 in the opposite ear. Mounted within the bearings thus formed by the aperture and slot 14 and 15 respectively in the opposite ears upon each of the ends of the fire pot is a rocker bar 16. This rocker bar is provided with a pintle 17 at one end for engagement within the aperture 14, and is adapted to be supported at a distant point in its length within the slot 15. A head or damper portion 18 is arranged on the rocker bar between its points of connection with the spaced ears 13, and a detent 19 projects from the lowermost portion of the head 18 to normally lie adjacent and to close the opening 11 in the adjacent end of the fire pot. It will be observed that the heads and detents upon each of the rocker bars 16 are coextensive with the openings 11 in the opposite ends of the said fire pot, and are adapted to normally close the said openings. The rocker bar 16 is extended at its opposite end beyond the lines of the fire pot and is provided with an enlarged portion 20 to be gripped by the hand of the operator.

A fuel hopper 21 is arranged to be supported by each of the rocker bars 16 at the opposite ends of the fire pot. Each hopper comprises downwardly and inwardly curved walls 22 forming a side and bottom for the hopper, and ends 23 projecting inwardly from the opposite sides of the bottom portion 22; the forward edges 24 of the hopper ends 23 are cut angularly and inwardly to conform to the inclination of the outer faces of each of the ends 9 of the fire pot. To facilitate securing the hopper in proper position upon the end of the fire pot, slots 25 are arranged to extend inwardly from the inclined edges 24 of the ends of the hopper 23. These slots are adapted to engage over the rocker bar 16 adjacent the opposite ends of the head portion thereof, and between the ears 13. It will be observed that the bottom 22 of each of the hoppers 21 is curved at its lowermost point in such manner that the detent 19 upon the rocker bar 16 will traverse the same in close proximity thereto, and it will also be observed that the forward edge of the bottom 22 terminates adjacent the lowermost wall of the opening 11.

In operation, the fire is made within the fire pot, and the rocker bars at each end of the fire pot are oscillated to force fuel, such as coal, into the adjacent opening 11 to rest upon the lowermost wall thereof. The detent and head normally hold the hopper closed, so that the flow of fuel from the hopper into the fire pot will be prevented. The heat within the fire pot will operate upon the fuel in the openings 11 to coke or draw the gas therefrom, the said gas being permitted to escape into the fire pot through the channels 12. Upon further oscillation of the rocker bars 16, the coke within the openings 11 will be forced into the fire pot to be consumed by the fire therein, and additional fuel will be seated in the openings 11. It is thus seen that an efficient coking and feeding operation is obtained.

I have described my invention as being provided with openings and hoppers at the opposite ends of the said fire pot, but it is to be understood that only one need be provided if desired.

I am also aware that the device is susceptible to various changes in the minor details of construction and arrangement of parts, and I reserve to myself the right to make such changes as I see fit without departing from the spirit of the invention or exceeding the scope of the claim.

I claim:

In a device of the class described, a fire pot having an opening in one end, ears arranged to project from the outer face of said end adjacent said opening, the said ears being provided with bearings, a rocker bar mounted in said bearings, a head and detent on said rocker bar for covering said opening when said bar is rocked in one direction, a hopper provided in its forward edges with slots for engagement over said rocker bar adjacent the ends of said head, and the bottom portion of said hopper being curved downwardly and forwardly to communicate with the lowermost wall of said opening, substantially as described.

In testimony whereof, I affix my signature, in the presence of two witnesses.

WILLIAM N. SOPHER.

Witnesses:
A. W. Mayer,
W. F. Spahn.

Copies of this patent may be obtained for five cents each, by addressing the "Commissioner of Patents, Washington, D. C."